United States Patent [19]

Petrus et al.

[11] Patent Number: 5,077,384

[45] Date of Patent: Dec. 31, 1991

[54] CARBON MONOXIDE/OLEFIN COPOLYMER HAVING WIDE MOLECULAR WEIGHT DISTRIBUTION

[75] Inventors: Leonardus Petrus; Philip J. M. M. de Smedt, both of Amsterdam, Netherlands

[73] Assignee: Shell Oil Company, Houston, Tex.

[21] Appl. No.: 529,305

[22] Filed: May 29, 1990

[30] Foreign Application Priority Data

Aug. 17, 1989 [NL] Netherlands .................... 8902081

[51] Int. Cl.$^5$ ............................................. C08G 67/02
[52] U.S. Cl. ................................................... 528/392
[58] Field of Search ........................................ 528/392

[56] References Cited

U.S. PATENT DOCUMENTS

| | | | |
|---|---|---|---|
| 2,495,286 | 1/1950 | Brubaker | 260/63 |
| 3,694,412 | 9/1972 | Nozaki | 260/63 CQ |
| 4,818,810 | 4/1989 | Drent | 528/392 |
| 4,835,250 | 5/1989 | Drent | 528/392 |
| 4,843,144 | 6/1989 | Van Broekhoven et al. | 528/392 |
| 4,868,282 | 9/1989 | Van Broekhoven et al. | 528/392 |
| 4,880,903 | 11/1989 | Van Broekhoven et al. | 528/392 |

FOREIGN PATENT DOCUMENTS

| | | |
|---|---|---|
| 121965 | 10/1984 | European Pat. Off. . |
| 181014 | 5/1986 | European Pat. Off. . |
| 213671 | 3/1987 | European Pat. Off. . |
| 257663 | 3/1988 | European Pat. Off. . |
| 1081304 | 8/1967 | United Kingdom . |

*Primary Examiner*—Harold D. Anderson

[57] ABSTRACT

Novel, linear alternating polymer compositions of carbon monoxide and at least one ethylenically unsaturated hydrocarbon having a relatively wide molecular weight range are produced by contacting ethylene and unsaturated hydrocarbon in the presence of a polymerization catalyst under different polymerization conditions of temperature and pressure. One set of polymerization conditions will have a higher reaction temperature and a lower reaction pressure than another.

7 Claims, No Drawings

CARBON MONOXIDE/OLEFIN COPOLYMER HAVING WIDE MOLECULAR WEIGHT DISTRIBUTION

FIELD OF THE INVENTION

This invention relates to polymer compositions comprising linear alternating polymers of carbon monoxide and at least one ethylenically unsaturated hydrocarbon. More particularly, the invention relates to such compositions of relatively wide molecular weight distribution and to a process of producing such compositions.

BACKGROUND OF THE INVENTION

The class of polymers of carbon monoxide and olefin(s) is well known in the art. Brubaker, U.S. Pat. No. 2,495,286, produced such compositions of relatively low carbon monoxide content in the presence of free radical initiators, e.g., peroxy compounds. G.B. 1,081,304 discloses such polymers of higher carbon monoxide content produced in the presence of an alkylphosphine complex of palladium salts as catalyst. Nozaki extended the reaction to produce linear alternating polymers in the presence of arylphosphine complexes of palladium moieties and certain inert solvents. See, for example, U.S. Pat. No. 3,694,412.

More recently, the class of linear alternating polymers of carbon monoxide and at least one ethylenically unsaturated hydrocarbon has become of greater interest in part because of the greater availability of the polymers. These linear alternating polymers, now known as polyketones or polyketone polymers, are also produced by more recent processes which are illustrated by a number of published European Patent Applications including 121,965, 181,014, 213,671 and 257,663. These processes typically involve the use of a catalyst composition formed from a Group VIII metal selected from palladium, cobalt or nickel, the anion of a strong non-hydrohalogenic acid and a bidentate ligand of phosphorus, arsenic, antimony or nitrogen.

The resulting polymers are relatively high molecular weight, thermoplastic materials having established utility in the production of shaped articles produced by methods such as extrusion and injection molding which are conventional for thermoplastics. When the production of the polyketone polymers is conducted under relatively constant conditions of temperature, pressure and feed composition the polymers which result have a rather narrow molecular weight distribution. This narrow molecular weight range is desirable for many applications of the polyketone polymers. The molecular weight distribution is described by the term "Q" which is the quotient of the weight average molecular weight ($M_w$) and the number average molecular weight ($M_n$). For the polyketone polymers produced according to the above published European Patent Applications, a typical value for Q will be from about 2.0 to about 2.3. For some polymerizations conducted over a long reaction time or on a technical scale the value for Q may be from about 2.3 to about 2.5, reflecting a somewhat wider molecular weight distribution.

For other applications however, a somewhat broader molecular weight range may be desirable because of processing considerations. A polymer having a wider molecular weight range will normally exhibit better melt flow properties including better melt strength and lower heat of friction during extrusion. It would therefore be of advantage to provide polyketone polymers having a wider range of molecular weights.

SUMMARY OF THE INVENTION

The present invention provides polymer compositions comprising linear alternating polymers of carbon monoxide and at least one ethylenically unsaturated hydrocarbon, which polymer compositions have a relatively wide molecular weight distribution. More particularly, the present invention provides such compositions by the process of contacting carbon monoxide and ethylenically unsaturated hydrocarbon in the presence of a polymerization catalyst under differing polymerization conditions.

DESCRIPTION OF THE INVENTION

The linear alternating polymer compositions of the invention are produced, by contacting carbon monoxide and at least one ethylenically unsaturated hydrocarbon in the presence of a suitable polyketone polymerization catalyst under polymerization conditions which vary during the production of polymer. In general, the polymers are produced under at least two sets of polymerization conditions wherein the reaction temperature is higher and the reaction pressure is lower under one set of conditions than the other.

The ethylenically unsaturated hydrocarbons which are useful as precursors of the polyketone polymers have up to 20 carbons inclusive, preferably up to 10 carbon atoms inclusive, and are aliphatic including ethylene and other α-olefins such as propylene, 1-butent, isobutylene, 1-hexene, 1-octene and 1-dodecene, or are arylaliphatic containing an aryl substituent on a carbon atom of an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-propylstyrene. The preferred linear alternating polymers are copolymers of carbon monoxide and ethylene or are terpolymers of carbon monoxide, ethylene and a second ethylenically unsaturated hydrocarbon of at least 3 carbon atoms, particularly an α-olefin such as propylene.

When the preferred polymers are produced, there will be at least two units incorporating a moiety of ethylene for each unit incorporating a moiety of the second hydrocarbon. Preferably, there will be from about 10 units to about 100 units incorporating a moiety of ethylene for each unit incorporating a moiety of the second hydrocarbon. The polymer chain of the preferred polyketone polymers is therefore represented by the repeating formula

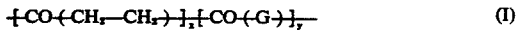  (I)

wherein G is the moiety of second hydrocarbon of at least 3 carbon atoms polymerized through the ethylenic unsaturation thereof and the ratio of y:x is no more than about 0.5. When the process of the invention is employed to produce copolymers of carbon monoxide and ethylene, there will be no second hydrocarbon present and the copolymers are represented by the above formula I wherein y is zero. When y is other than zero, i.e., terpolymers are produced, the $-CO-(-CH_2CH_2-)-$ units and the $-CO-(-G-)-$ units are found randomly along the polymer chain and the preferred ratios of y:x will be from about 0.01 to about 0.1. The end groups or "caps" of the polymer chain will depend upon what materials were present during the production of the polymer and whether and how the polymer has been purified. The end groups are not, however, of any great apparent significance so far as the properties of the polymer are concerned so that the polymers are fairly represented by the formula for the polymer chain as depicted above.

Of particular interest are the polyketone polymers of number average molecular weight from about 1000 to about 200,000, particularly those polyketone polymers of number average from about 5,000 to about 90,000, as determined by gel permeation chromatography or by other conventional methods. The physical properties of the polymer will depend in part upon the molecular weight, whether the polymer is a copolymer or a terpolymer, the nature of and the proportion of the second hydrocarbon present in the case of terpolymers and, of course, the molecular weight distribution. The polyketone polymers typically have melting points from about 175° C. to about 300° C., preferably from about 210° C. to about 270° C. The polymers have a limiting viscosity number (LVN), measured in m-cresol at 60° C. in a standard capillary viscosity measuring device, of from about 0.4 dl/g to about 10 dl/g, preferably from about 0.8 dl/g to about 4 dl/g.

The method for the production of the linear alternating polymers is illustrated by the above published European Patent Applications. In general, the carbon monoxide and ethylenically unsaturated hydrocarbon are contacted under the polymerization conditions employed in the process of the invention in the presence of a liquid reaction diluent and a catalyst composition formed from a palladium compound, the anion of a non-hydrohalogenic acid having a pKa below 2 and a bidentate ligand of phosphorus or nitrogen. The scope of the polymerization is extensive but, without wishing to be limited, the preferred palladium compound is a palladium alkanoate, particularly palladium acetate, and the preferred anion is the anion of trifluoroacetic acid or p-toluenesulfonic acid.

If the bidentate ligand to be employed as a precursor of the catalyst composition is a bidentate ligand of phosphorus, the preferred bidentate ligands of phosphorus are represented by the formula

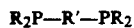

$$R_2P-R'-PR_2 \quad (II)$$

wherein R independently is a monovalent aromatic group of up to 10 carbon atoms which is hydrocarbyl containing only atoms of carbon and hydrogen or is substituted hydrocarbyl containing additional atoms, preferably in the form of polar substituents at least one of which is located on an aromatic ring carbon atom located ortho to the carbon atom connecting the aromatic substituent to the phosphorus. Illustrative R groups include phenyl, naphthyl, tolyl, 2-methoxyphenyl, 2,4-dimethoxyphenyl, 2-ethoxyphenyl and 2,6-diethoxyphenyl. The R' moiety is a divalent connecting group of up to 10 carbon atoms containing from 2 to 4 carbon atoms in the bridge. Illustrative of such R' groups are 1,2-ethylene, 1,3-propylene and 1,3-butylene. The preferred bidentate ligands of phosphorus are 1,3-bis(diphenylphosphino)propane and 1,3-[di(2-methoxyphenyl)phosphino]propane, especially the latter.

When the bidentate ligand to be employed as precursor of the catalyst composition is a bidentate ligand of nitrogen, the bidentate ligand is preferably represented by the formula

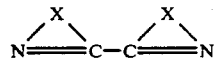

(III)

wherein X independently is a connecting group of up to 10 atoms with up to 4 additional atoms in the ring, up to two of which are nitrogen with any other atoms being carbon atoms. The preferred bidentate ligands of nitrogen are 2,2'-bipyridine and 1,10-phenanthroline.

The anion is provided in a quantity from about 1 mole to about 100 moles per mole of palladium. The anion is preferably provided as the free acid but alternatively the anion is provided as a non-noble transition metal salt, e.g., the copper salt, or even as the anion of the palladium compound catalyst composition component. If a bidentate phosphorus ligand is employed, it should be used in a quantity from about 0.5 mole to about 2 moles per mole of palladium. A nitrogen ligand, on the other hand, should be used in a quantity of from about 0.5 mole to about 100 moles per mole of palladium. Sufficient catalyst should be used to provide from about $1 \times 10^{-7}$ to about $1 \times 10^{-3}$ mole of palladium per mole of ethylenically unsaturated hydrocarbon and the molar ratio of unsaturated hydrocarbon to carbon monoxide is from about 10:1 to about 1:10.

The polymerization is conducted under polymerization conditions in the presence of a liquid reaction diluent. Suitable diluents include alkanols such as methanol and ethanol and alkanones such as acetone and methyl ethyl ketone. Methanol and acetone are preferred as reaction diluents.

The polymerization conditions to be employed in the production of the polymeric polyketone are variable and include at least two sets of polymerization conditions including two different reaction temperatures and two different reaction pressures. Each reaction temperature independently is from about 30° C. to about 150° C. although reaction temperatures from about 50° C. to about 135° C. are more often employed. The reaction pressures independently are from about 1 bar to about 200 bar, preferably from about 10 bar to about 100 bar. The relationship of the sets of polymerization conditions is such that, for one set of polymerization conditions, the reaction temperature is higher and the reaction pressure is lower than for another set of reaction conditions. It is not critical to the process of the invention which direction the reaction conditions vary during polymerization and it is not critical whether the conditions are changed sharply or gradually. In one modification of the process of the invention the polymerization is initiated by contacting the monomeric reactants and catalyst composition in a suitable reactor in the presence of the reaction diluent under a first set of polymerization conditions, i.e., a first reaction temperature and a first reaction pressure. After partial polymerization, the reaction temperature is decreased by allowing the reactor and contents to cool somewhat and the reaction pressure is increased as by providing to the reactor additional feed gas or, alternatively, an inert gas. Polymerization is then allowed to continue at the second set of reaction conditions, i.e., a second and lower reaction temperature and a second and higher reaction pressure. In the preferred modification, however, the reaction temperature is raised as by application of heat and the reaction pressure is lowered as by release of feed gas after partial polymerization. In this modification, the first set of polymerization conditions will include a higher reaction temperature and a lower reaction pressure than is found in the second set of reaction conditions. Various procedures and modifications of the use of differing reaction conditions will be apparent and will be satisfactory, provided that the reaction temperature and reaction pressure vary inversely during the course of the polymerization. The precise extent to which the reaction temperature and reaction pressure vary during the course of the polymerization. Best results are obtained, however, when the difference between reaction temperatures is at least 5° C., preferably at least 10° C., and the difference between reaction pressures is at least 5 bar, preferably at least 10 bar.

During the polymerization, reactant and catalyst composition contact is preferably maintained through provision of some means of agitation such as shaking or stirring. The polymer product is typically obtained as a material which is substantially insoluble in the media of its production and the product is recovered by conventional methods such as filtration or decantation. The polyketone polymer is used as recovered or is purified as by contacting the polymer with a solvent or complexing agent which is selective for the catalyst residues.

The polyketone polymer products of the invention are characterized by a relatively wide molecular weight distribution. Although there are a number of methods available for evaluating the molecular weight distribution of a polymeric product, one such conventional method employs the number average molecular weight of the product, $M_n$, and the weight average molecular weight, $M_w$. The quotient of the weight average molecular weight and the number average molecular weight is measured by the term "Q". For any given polymer containing a range of polymer molecular weights, as is almost invariably the case, the Q value varies with width of the molecular weight range. The higher the Q value is determined to be, the broader the molecular weight range. As stated, the Q values for the conventional polyketone polymers range from about 2.0 to about 2.5. In contrast, however, the polyketone polymers of the invention are characterized by Q values above about 3.0 and preferably above about 4.0.

Because of the broader molecular weight ranges of the polyketone polymers produced according to the process of the invention, as reflected in the higher Q values, the products are characterized by better melt flow properties including better melt strength and less heat of friction during extrusion. Although the polyketone polymers are thermoplastic and have the utilities traditionally associated with thermoplastics, the polyketone polymers are particularly useful in the production of bottles and other containers by processes such as blow molding or in the production of fibers or wire and cables by extrusion processes.

The present invention is further illustrated by the following Comparative Experiments (not of the invention) and Illustrative Embodiments which should not be regarded as limiting.

ILLUSTRATIVE EMBODIMENT I

A linear alternating copolymer of carbon monoxide and ethylene was produced by charging 30 kg of methanol to an autoclave of 100 liter capacity equipped with a mechanical stirrer. The contents of the autoclave were heated to 75° C. and ethylene was introduced until a pressure of 25 bar had been reached. Carbon monoxide was then introduced until a pressure of 50 bar was reached. Polymerization was initiated by charging to the autoclave 127 ml of a catalyst composition solution prepared by adding to 1 liter of acetone 1 g of palladium acetate, 5.1 g of trifluoroacetic acid and 2.4 g of 1,3-bis[di(2-methoxyphenyl)phosphino]propane. When the addition of catalyst solution was begun, carbon monoxide addition at the rate of 250N liter/hr was also started. During the resulting polymerization, the pressure was kept at 50 bar by releasing excess feed gas. After seven hours, the temperature of the contents of the autoclave was raised to 90° C. over a 30 minute period as the pressure was gradually lowered to 15 bar. After 20 hours the polyemrization was terminated by cooling the reaction and contents and releasing the pressure. A yield of 4.9 g of copolymer was obtained. The copolymer had a $M_w$ of 59,000 and a Q of 4.3.

ILLUSTRATIVE EMBODIMENT II

A linear alternating terpolymer of carbon monoxide, ethylene and propylene was produced by a continuous process in two reactors connected in series with the product mixture from the first reactor and fresh feed being passed continuously to the second reactor. The catalyst solution had the same composition as that of Illustrative Embodiment I. The reaction conditions employed in the reactors are listed in the Table.

The quantity of terpolymer produced was 790 g per hour. The terpolymer had a $M_w$ of 38,000 and a Q of 4.5.

TABLE

|  | Reactor 1 | Reactor 2 |
| --- | --- | --- |
| Reactor volume, liters | 100 | 150 |
| Feed rates |  |  |
| Methanol, kg/hr | 4.0 | — |
| Carbon Monoxide, Nl/hr | 217 | 267 |
| Ethylene, Nl/hr | 239 | 158 |
| Propylene, kg/hr | 0.31 | — |
| Catalyst Solution, ml/hr | 42 | — |
| Pressure, bar | 50 | 20 |
| Temperature, °C. | 72 | 90 |
| Suspension present in reactor, kg | 40 | 40 |
| Suspension concentration, % | 8.2 | 16.5 |

COMPARATIVE EXAMPLE I

A linear alternating copolymer of carbon monoxide and ethylene was produced by charging 30 kg of methanol to a 100 PJMMds liter autoclave. As the contents of the autoclave were heated to 90° C., an equimolar mixture of carbon monoxide and ethylene was added. When the desired temperature was reached, a pressure of 50 bar was present. Polymerization was initiated by introducing 127 ml of the catalyst solution described in Illustrative Embodiment I. The pressure was maintained at 50 bar during polymerization by continuous addition of the equimolar mixture of carbon monoxide and ethylene. After 9 hours the polymerization was terminated by cooling the autoclave and contents to ambient temperature and releasing the pressure. The polymer product was recovered by filtration, washed with methanol and dried. The yield of polymer was 4.3 kg. The polymer had a $M_w$ of 44,000 and a Q of 2.1.

COMPARATIVE EXAMPLE II

A linear alternating copolymer of carbon monoxide, ethylene and propylene was produced by charging 40 kg of methanol and 4.8 kg of propylene to an autoclave of 100 liters capacity equipped with a mechanical stirrer. The autoclave contents were heated to 79° C. and ethylene was introduced until a pressure of 27 bar was reached and carbon monoxide was added until a pressure of 52 bar was reached. Polymerization was initiated by introducing 127 ml of the catalyst composition solution of Illustrative Embodiment I, and at the same time carbon monoxide was added at the rate of 250 Nl/hr, ethylene at the rate of 200 Nl/hr and propylene at the rate of 0.1 kg/hr. During polymerization the pressure was maintained at 52 bar by release of excess feed gas. The polymerization was terminated after 26 hours by cooling the autoclave and contents to ambient temperature and releasing the pressure. The polymer product was recovered by filtration, washed with methanol and dried. The yield of terpolymer was 10.4 kg and the terpolymer had a $M_w$ of 37,000 and a Q of 2.2.

What is claimed is:

1. A linear alternating polymer of carbon monoxide and at least one ethylenically unsaturated hydrocarbon wherein the quotient of the weight average molecular weight divided by the number average molecular weight is above about 4.

2. The polymer of claim 1 represented by the repeating formula

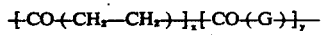

wherein G is the moiety of an ethylenically unsaturated hydrocarbon of at least 3 carbon atoms polymerized through the ethylenic unsaturation thereof and the ratio of y:x is no more than about 0.5.

3. The polymer of claim 2 wherein y is zero.

4. The polymer of claim 2 wherein G is a moiety of propylene and the ratio of y:x is from about 0.01 to about 0.1.

5. The polymer of claim 1 wherein the number average molecular weight is less than about 200,000.

6. The polymer of claim 5 where the number average molecular weight is less than about 90,000.

7. A shaped article made from the polymer of claim 1.

* * * * *